W. HUNT.
VEHICLE SPRING.
No. 182,118.        Patented Sept. 12, 1876.
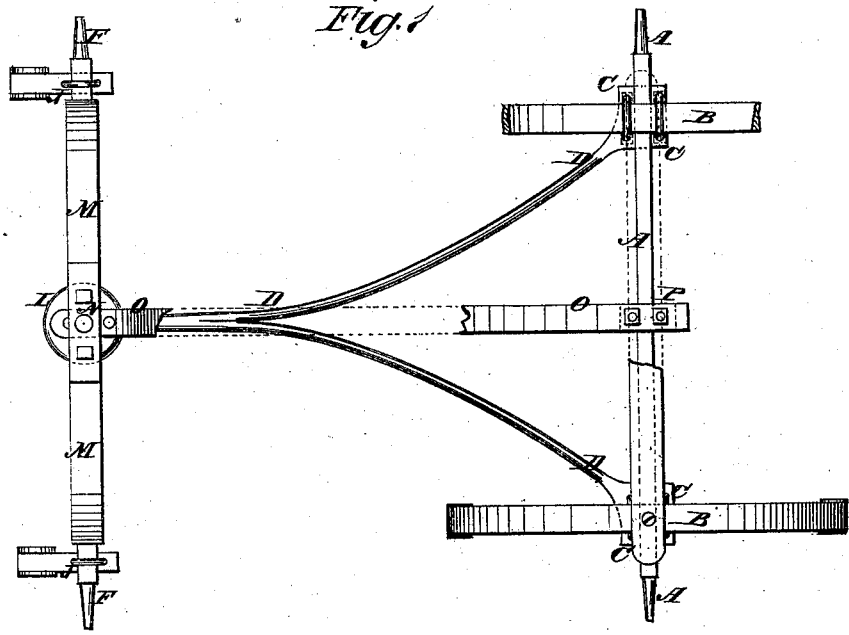
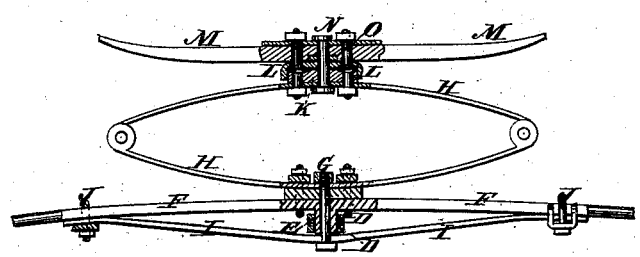
WITNESSES:
INVENTOR:
BY
ATTORNEYS.

UNITED STATES PATENT OFFICE.

WILLIAM HUNT, OF OSKALOOSA, IOWA.

IMPROVEMENT IN VEHICLE-SPRINGS.

Specification forming part of Letters Patent No. 182,118, dated September 12, 1876; application filed May 22, 1876.

*To all whom it may concern:*

Be it known that I, WILLIAM HUNT, of Oskaloosa, Mahaska county and State of Iowa, have invented a new and Improved Vehicle-Gearing, of which the following is a specification:

In the accompanying drawing, Figure 1 is a top view of a wagon-gearing, to which my improvement has been applied, part being broken away to show the construction. Fig. 2 is a front view of the same, parts being broken away to show the construction; and Fig. 3 is a detail side view of the forward end of the reach.

Similar letters of reference indicate corresponding parts.

The object of this invention is to simplify the construction and increase the strength of the gearing of wagons and other vehicles, and at the same time prevent the springs from being twisted or strained.

The invention will first be described in connection with the drawing, and then pointed out in the claim.

In the annexed drawing, A is the rear axle, to which are secured the rear springs or spring B, by clips C, in the usual way. D represents the parts of the reach, the rear ends of which are widened, and have each two pairs of holes formed through them to receive the bows of the clips C, by which they are secured to the axle A. When two rear springs are used, they are secured to the axle by the same clips that secure the ends of the reach D. When a single rear spring is used, it is secured to the center of the axle A by other clips. The parts of the reach D are curved toward each other, and their forward parts, about ten inches from their forward ends, are welded together. The extreme forward ends of the parts of the reach D are spread apart vertically, and have a hole formed through them to receive a cylindrical block, E, placed upon the lower side of the forward axle F, and through which the bolt G passes. The bolt G also passes through the axle F, through the center of the lower part of the forward spring H, and through the bar I placed beneath and parallel with the axle F. The split ends of the reach D bear against the axle F and the bar I, and, by their elasticity, prevent rattling and noise. The ends of the bar I rest against the lower side of the axle F, and are secured to said axle by the clips of the thill-couplings J. The end parts of the bar I are punched from the lower side, to form projections upon their upper sides, to enter recesses in the lower side of the axle F, to prevent the said bar from slipping. The bar I strengthens the middle part of the axle F, and prevents it from sagging, and at the same time enables it to be made lighter than would otherwise be practicable. To the upper part of the forward spring H is bolted a circular block or disk, K, which fits into a circular recess in the block, disk, or wheel L, which is bolted to the middle part of the spring-bar M. The upper part of the forward spring H and its disk or plate K are connected with and pivoted to the bar M and the recessed or flanged block or plate by a bolt, N, which passes through the said parts, the blocks or plates K L thus forming the fifth wheel of the vehicle. O is a spring brace-bar, to hold the springs perpendicular, the rear end of which is secured to the center of the rear axle A by a clip, P. The forward end of the spring brace-bar O is inserted between the block L and spring-bar M, and has a hole formed through it, through which the bolt N passes. The end of the bar O is also bolted to the block L in front and rear of the said bolt N. The hole in the forward end of the spring brace-bar O, for the bolt N, is formed at a distance from the rear axle A equal to the distance of the central bolt G of the lower part of the forward spring H from said axle A. By this construction, when the vehicle is loaded so as to compress the springs and bring the brace O into a horizontal position, the parts of the spring H will be nearly vertical, and thus in the most favorable position to resist a strain.

Having thus described my invention, what I claim as new, and desire to secure by Letters Patent, is—

The spring-bar M and brace-bar O, combined with the plates K L and bolt N, as and for the purpose specified.

WILLIAM HUNT.

Witnesses:
L. H. HOLE,
B. GREGORY.